Sept. 21, 1965 D. SCHIFF 3,206,925
GASEOUS BREAKDOWN MICROWAVE ENGINES
Filed May 18, 1959 3 Sheets-Sheet 1

INVENTOR
DANIEL SCHIFF
BY
ATTORNEY

Sept. 21, 1965  D. SCHIFF  3,206,925
GASEOUS BREAKDOWN MICROWAVE ENGINES
Filed May 18, 1959  3 Sheets-Sheet 2

INVENTOR
DANIEL SCHIFF
BY
ATTORNEY

United States Patent Office

3,206,925
Patented Sept. 21, 1965

3,206,925
GASEOUS BREAKDOWN MICROWAVE ENGINES
Daniel Schiff, Framingham Center, Mass., assignor to Raytheon Company, Lexington, Mass., a corporation of Delaware
Filed May 18, 1959, Ser. No. 813,837
13 Claims. (Cl. 60—35.5)

This invention pertains generally to engines, and more particularly to engines adapted to obtain operating energy from an incident microwave electromagnetic field. The term "engine" is employed in the broad sense herein, and is intended to refer to any machine or apparatus by means of which physical power is applied to produce a physical effect as, for example, in the utilization of radiant energy to produce a physical force. While the description that follows is directed primarily to jet engines and the like, it will be understood that the jet engine is merely exemplary of the several forms which the apparatus of the present invention may take.

In general, there are two broad types of jet engines. One of these provides a propulsive jet consisting of highly heated, compressed atmospheric air usually admixed with the products of the combustion produced by the burning of a fuel in the air, with the thermal energy of the fuel being employed to raise the air temperature to the desired value. This type of jet engine is generally referred to as an air-breathing or thermal jet engine. In the other type of engine there is also a propulsive jet formed by generating large quantities of high-pressure, high-temperature gases, but this latter type of jet is the result of a chemical reaction which does not utilize atmospheric air, with both the fuel and an oxidizer therefor being carried as propellants in tanks or the like associated with the engine. This latter type of engine is the rocket engine.

As is well known, the air-breathing jet engines are generally classified as either ramjet, turbojet or pulsejet. The first of these three types is the simplest, since it needs few, if any, moving parts. The simple ramjet depends upon motion through the atmosphere to force air through the inlet and into the diffuser section where the air is compressed preparatory to its combination with a suitable fuel in the combustion chamber. The hot gases produced by the combustion then flow through a suitable exhaust nozzle where they are expanded and finally discharged into the surrounding atmosphere to provide the desired propulsive thrust. The turbojet engine differs from the ramjet in that the exhaust gases drive a turbine which, in turn, drives an air compressor for compressing the air introduced into the combustion chamber, and as a result the turbojet does not primarily rely on velocity relative to the surrounding atmosphere in order to achieve operation. The pulsejet differs from the ramjet in the main in the fact that the pulsejet is characterized by intermittent firing as opposed to the continuous firing of the ramjet.

With respect to rocket engines, there are two basic types, viz., those employing liquid propellants and those employing solid propellants.

The closed-cycle turbine engine is exemplary of non-jet engines to which the inventive concept of the present invention applies, and it will generally be found that the efficiency of the closed-cycle engine will surpass that of the aforementioned engines at low airspeeds. In a closed-cycle turbine engine a suitable gas is confined in a closed circuit including a compressor, a heat exchanger and a turbine, and the shaft power developed by the turbine is utilized to drive the compressor and a suitable propulsion means such as a propeller. Alternatively, the turbine shaft may also drive an auxiliary compressor which compresses a suitable gaseous medium (such as air) for creation of a propulsive reaction jet at a nozzle or the like.

Irrespective of the particular one of the several aforementioned types of engines that one may choose to employ, in each such choice one must be prepared to supply a sufficient amount of fuel to be carried along with the engine in the craft which it is to propel, so that a propulsive force may be exerted throughout the intended power portion of the flight span of such craft. In the case of ordinary air-breathing engines, all that need be supplied is an appropriate fuel for burning in the atmospheric air that is taken into the engine for the combustion process, while the rocket engines require the carrying of both a fuel and an oxidizer therefor. In the case of the closed-cycle turbine, some fuel is normally needed to create a heat source for energizing the heat exchanger. It is evident that these requirements place a limitation upon the operation and effectiveness of any craft which is to be propelled by such engines, whether for military or other purposes, since not only is the maximum time of continuous operation thereof limited by the amount of fuel or other propellants carried on board the craft, but the very fact that such fuels must be carried is effective in limiting the maximum range and operation time of such craft in view of the additional weight factor imposed by the presence of such fuels. In addition, a reduction of fuel weight also permits a greater payload for a given total weight of the craft.

The utility of an aircraft, space vehicle or the like which is capable of sustained flight over an indefinitely long period of time without employing a local fuel supply is evident, and the applications therefor are numerous. For example, a vehicle capable of perpetual operation (except for mechanical failure) and stationed in space above the surface of the Earth, either within or without the atmosphere thereof, may perform guidance and surveillance tasks by radar techniques, along with guidance and protection of defense vehicles, and may simultaneously provide long-haul broadband communications. Systems of such vehicles or platforms may be established to provide radar and communication networks.

These desired operational characteristics are provided by a vehicle driven by the engine of the present invention, which engine is energized by means of transmitted microwave electromagnetic energy that is beamed toward the vehicle. The engine converts the microwave energy incident upon the vehicle into appropriate mechanical forces which produce the desired flight operation of the vehicle. The advantages attendant the utilization of microwave energy, in contrast to electromagnetic energy of other wavelengths, are readily apparent. Microwaves have been generally defined as radio waves whose wavelength is less than 30 centimeters, with a lower wavelength limit on the order of one millimeter or one centimeter sometimes being applied to what is called "the microwave region." The superiority of microwaves is due in part to the fact that it is generally necessary to focus the transmitted energy so as to achieve a desirably high power density at a remote point or area with respect to a given generator or transmitter power level. In accordance with the laws of optics, the sharpness of the beam produced by an antenna varies as the ratio of antenna dimensions to the wavelength of the transmitted energy. Thus, for a given or desired power density or beam sharpness, a decrease in the wavelength of the transmitted energy permits a corresponding decrease in the dimensions of the antenna. From the standpoint of mechanical convenience, it is generally desirable to employ small antennas and other components, and it is therefore advantageous to employ energy of very short wavelength. In addition, the difficulties encountered in relatively long wave transmission as a result of natural and man-made interference or noise (which noise would interfere with the transmission of radar or communications intelligence via the microwave power beam) do not occur with any appreciable significance at microwave frequencies. Also, where the space vehicle is to be operated at an altitude above the ionosphere, long wave transmission will generally be reflected by the reflecting layers thereof, while microwaves pass through such layers substantially unaffected.

In view of the several advantages stated above, it might appear desirable to employ the shortest wavelength possible commensurate with the power-generating capabilities of the transmitter at the wavelength chosen. A lower limit is fixed, however, for the wavelength that may be used in a practical radiating system in view of the increasing losses due to absorption occurring in the atmosphere at wavelengths below five to ten centimeters. In the one to two centimeter region there is a peak in absorption by water vapor, and even for dry air the absorption of electromagnetic energy increases very rapidly below one or two centimeters. It may thus be seen that microwaves in a region having the approximate bounds of two and thirty centimeters are readily adaptable to convenient radiation of energy to a remote point with small transmission loss, with the preferred wavelengths being of the order of five or ten centimeters in order to accomplish efficient focusing with a transmitting lens system of reasonable size without inflicting an intolerable power loss by absorption.

The key to the practical utilization of high-power electromagnetic beams for remote energization of the propulsion engine in aircraft, space vehicles and the like is a device which will generate large amounts of power within this wavelength region. In addition, many applications of such high-power beams require such refinements as broad electronic bandwidth and low phase distortion, placing the additional requirement of sophisticated performance on the high-power generator. A device which currently satisfies the dual requirements of high power output and refined performance is the Amplitron tube, a relatively new type of cross-field vacuum tube which may be used as a compact, highly efficient, broadband amplifier capable of handling high peak and average powers, and which generally comprises a circular but non-reentrant, dispersive network matched at both ends over the frequency region of interest, and a reentrant electron beam originating from a continuously-coated (or nearly so) cathode coaxial with the network, with a D.C. potential being applied between the cathode and anode, and a magnetic field applied parallel to the axis of the cathode and transverse to the electric field between the anode and the cathode. For a more complete description of the Amplitron, reference may be had to the copending application of W. C. Brown, Serial No. 706,812, filed January 2, 1958, now United States Patent No. 2,933,723 issued April 19, 1960, and assigned to the assignee of the present invention, for "Low Level Duplexer System." Amplitrons currently available are capable of producing 15 or 20 kilowatts of average radio-frequency power in the neighborhood of ten centimeters in wavelength, and future models are expected to yield 500 kilowatts or more average power, with 50 megawatt peak power.

It is accordingly a primary object of the invention to provide an engine responsive to incident microwave energy and characterized by its ability to produce a flow of heated gaseous media without the combustion of a fuel.

An accompanying object of this invention is to provide a heat exchanger adapted to be energized by incident microwave energy.

An ancillary object of the invention is to provide an engine capable of producing a propulsive thrust for an aircraft, space vehicles and the like without necessitating the carrying of a supply of fuel for energization of such engine.

A further object of the invention is to provide an engine for aircraft or the like which are adapted to be operated by means of remotely generated microwave energy.

Another object of the invention is to provide a closed-cycle turbine engine for a vehicle wherein the vehicle may be propelled by such engine for an indefinitely long period of time without the transportation of fuel or other propellant by such craft.

Still another object of the invention is to provide an air-breathing jet engine for a vehicle wherein the vehicle may be propelled by such engine for an indefinitely long time period without the transportation of fuel or other propellant by such craft.

Yet another object of the invention is to provide a jet engine of the rocket type for a vehicle wherein the vehicle need carry only a single light-weight propellant medium, with the energy for heating such propellant being in the form of remotely generated radiant energy.

In accordance with a preferred form of the apparatus of the present invention, these and other objects are achieved by means of an engine including a heat exchanger adapted to be energized by microwave energy to ionize and heat a gaseous medium therein, with the resulting expansion of such medium producing a flow thereof for conversion into a propulsive thrust. In one preferred embodiment, the heat exchanger comprises a container for at least partially enclosing a gaseous medium which is to be heated. Means are provided for admitting a microwave electromagnetic field into the interior of the enclosure means, and this electromagnetic field serves to ionize the gaseous medium so enclosed. Upon such ionization, the gas will absorb such electromagnetic energy to a degree dependent upon both the electron concentration or density and the gas pressure. Where the electron density is significantly below the plasma resonance density (that electron density below which the ionized gaseous medium is transparent to microwave energy) for a given set of parameters, an appreciable signal level will be transmitted through the plasma and little will be absorbed. Where the electron density is greater than the plasma resonance density and the gas pressure is significantly less than two pounds per square inch, the microwave power is reflected from the ionized gas. However, when the electron density is in the range of from one to ten times the plasma resonance density, and the gas pressure is greater than approximately 2 pounds per square inch, little or no incident signal is transmitted through or reflected from the plasma, and most or all of such signal is absorbed therein to produce heat. Energy is thus extracted from the incident electric field and exhibited as heat in the gaseous medium. This heated gas may then be utilized to drive a suitable turbine or the like, or may be directly formed into a jet stream to provide a propulsive thrust force. Since the heat is generated in the gas itself, instead of in a heat-exchanging radiator or other structural element, the microwave energy that is converted to heat is immediately available for performing work. This latter feature is particularly advantageous in transient state conditions with respect to the ability of the engine of this invention to provide almost instantaneous response to a change in the level of the applied microwave energy, since no time lag is involved in converting electromagnetic energy to heat in a radiator structure and then transferring it to the cooling gas.

As applied to the configurations of any of the aforementioned types of jet engines, the heat exchanger of the present invention will generally take the place of the combustion chamber. For example, in the air-breathing types of jet engines the compressed air will pass through the heat source and will subsequently be expanded in a suitable nozzle to provide the desired thrust. In the rocket type engine, a suitable gaseous propellant of low molecular weight (in order to achieve greater specific impulse) will pass through the heat source to be expanded and forced through a suitable nozzle to provide a reaction stream.

With the above considerations and objects in mind, the invention will now be described in connection with a preferred embodiment thereof given by way of example and not of limitation, and with reference to the accompanying drawings, in which.

Figure 1:
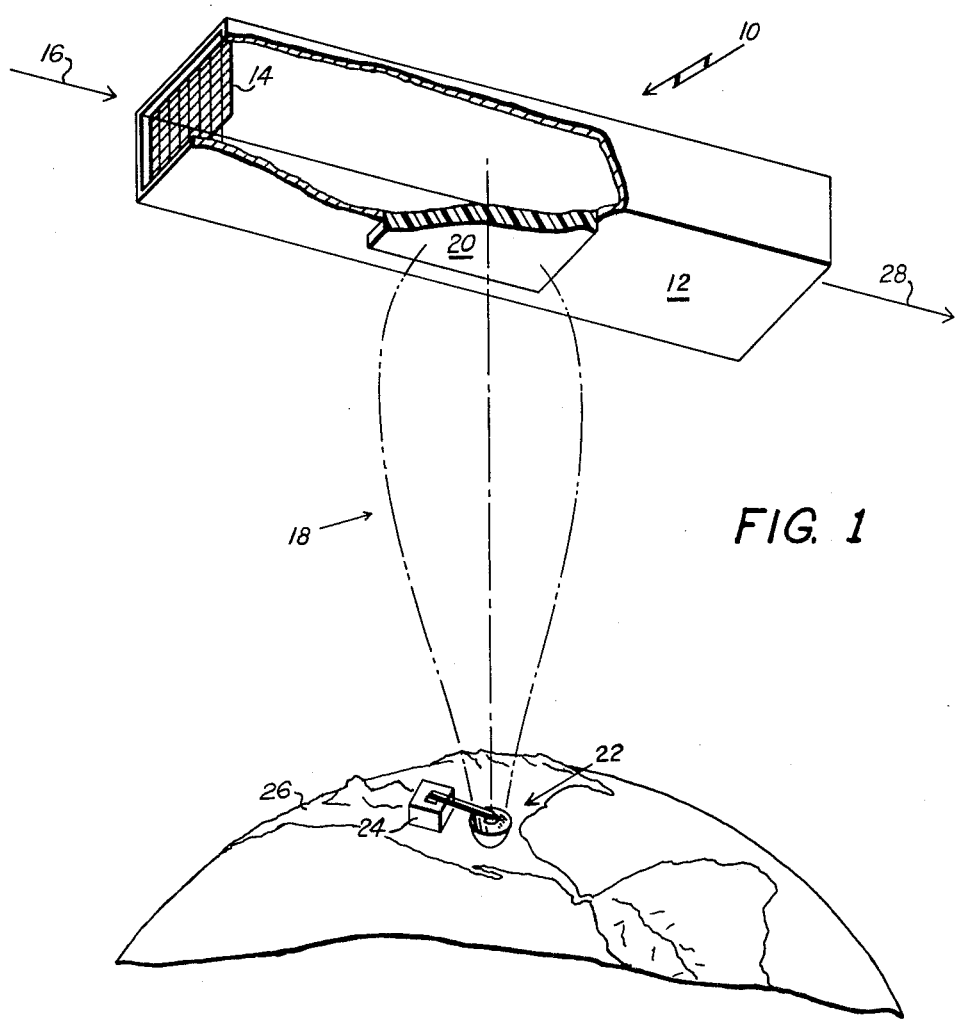
FIG. 1 is a perspective view, partly broken away, of a basic form of the heat exchanger of the present invention, with the system for energizing same being schematically indicated.

It is well known that both D.C. and A.C. electric fields can cause ionization or "breakdown" of a gas, either with or without the presence of electrodes and confining walls, if the incident field strength is sufficiently great. The gas discharge breakdown occurs when the gain in electron density due to ionization of the gas becomes equal to the loss of electrons by diffusion, recombination or attachment. The electromagnetic field strength required for gaseous breakdown depends upon, among other things, the frequency of the incident electric field, the chemical constitution of the gas, the pressure of the gas, and the electrode spacing and dimensions of the container (where such elements are employed).

In the general vicinity of one atmosphere of pressure, the field strength necessary to cause breakdown increases with pressure for a given frequency. This is a result of the fact that the time between collisions of free electrons with atoms of the gas decreases as pressure increases, and the kinetic energy which may be gained by the electron from a given incident electromagnetic field during the intervals between such collisions decreases correspondingly. In order to ionize one atom subsequent to an inelastic collision with another atom, an electron must gain all of the energy required for ionization after such inelastic collision, since the electron loses almost all of its energy in an inelastic collision. As a result of the fact that an electron loses little of its energy in an elastic collision, the energy level of an electron subsequent to an elastic collision is generally greater than zero, and the energy increment necessary for ionization is correspondingly reduced. It is thus apparent that ionization may be achieved more easily (i.e., at lower field strengths) in gases which provide a preponderance of elastic collisions, with the inelastic collision preferably being limited to those actually producing ionization. Also, for any selected gaseous medium, the kinetic energy gained by the electron in a given time interval increases as the field strength increases.

Where the pressure is much lower than one atmosphere, the time between electron-atom collisions increases and may even become greater than the period of the incident A.C. field. In such case, the electron will oscillate out of phase with the external or incident field between collisions, and the energy gained from the field will remain constant for a given field strength over a wide range of pressures. The field strength required to effect breakdown then remains constant with decreasing pressure at a given frequency until the point is reached where the atom density becomes so low that the ionization rate decreases, and the breakdown field strength thereupon increases rapidly with decreasing pressure. However, at the aforementioned low pressures, the incident electromagnetic field is generally reflected.

On the other hand, at relatively higher pressures, the frequent collisions which occur often throw the electron into phase with the incident A.C. field, and energy is thus absorbed rather than reflected. While there is no sharp delineation between those electron densities at which energy will be transmitted through the gas and those at which energy will be reflected or absorbed (depending upon the gas pressure), a suitable dividing line between the areas of good transmission and of reflection or absorption is provided by the electron density level called the plasma resonance density, the magnitude of which is of the order of $10^{13}/\lambda_2$ electrons per cubic centimeter, $\lambda$ being the wave length in centimeters.

The present invention contemplates a suitable combination of or compromise between the foregoing variable parameters and associated effects in order to effect the creation of a plasma density which will severely attenuate incident radiant microwave energy, with the plasma thereupon absorbing such incident energy to produce heat in the gas. In particular, where the electron density is greater than the plasma resonance density and the gas pressure is in a region greater than substantially two pounds per square inch, the incident microwave energy will be absorbed. In a closed-cycle engine system the internal gas pressure may initially be established at the desired level, and proper operation of such engine is effected irrespective of the external gas pressure (or, in other words, irrespective of the altitude at which the engine is operated). On the other hand, open-cycle engines will generally have to be operated at altitudes and air speeds at which the desired internal gas pressure is obtained.

Referring now to FIG. 1 of the accompanying drawings, the reference numeral 10 therein indicates in a general manner the remotely energized heat exchanger of the present invention. As may be seen, the heat exchanger 10 comprises a hollow member 12 of elongate form, having a suitable screen 14 near one open end thereof through which a suitable gaseous medium is passed, as indicated by the arrow 16. The screen 14 serves to define one terminus of the chamber in which the heating action is effected, and it will be understood that a similar screen (not shown) may be positioned across the opposite end of the hollow member 12 to define the opposite terminus. These screens are of such construction as to provide an effective wall for the electromagnetic energy that is employed in energizing the apparatus of this invention, yet they are sufficiently foraminous to allow a desirable free flow of air or other gaseous medium through the member 12 from left to right as seen in FIG. 1.

Suitable means are provided for admitting the energizing electromagnetic field (represented by the focused beam 18) into the interior of the member 12, an exemplary form of such admitting means being the window 20 in one wall of the member 12. Where the walls of the member 12 are of metal or the like, the inclusion of a window 20 of some material permeable to incident electromagnetic energy will generally be desirable, however, other suitable means may also be employed.

The microwave beam 18 is produced by an antenna assembly 22 which is energized with microwave energy generated in a transmitter 24, both of the latter elements being situated on the surface of the Earth or other mother planet 26. As will be appreciated by those skilled in the art, the representations of the transmitting equipment and microwave beam in FIG. 1 are highly diagrammatic in form, and the present invention is not limited to any particular transmitter or antenna assembly. As a practical matter, however, the reflector of the antenna assembly 22 is considerably larger than most of the reflectors of the prior art in order to focus a large amount of power at a high-altitude (e.g., 65,000 feet) space vehicle. In an exemplary embodiment, the antenna reflector is at least partially supported in a large bowl or other dug-out area on the Earth's surface so as to provide a convenient means of support therefor. Also, the antenna may actually comprise a large number of small horn and reflector assemblies. In addition, the transmitter 24 is capable of much greater power output than most of the prior art transmitters, and, as stated in the earlier paragraphs of this specification, the power-generating element of the transmitter is preferably an Amplitron tube in order to achieve sufficient power output.

In the operation of the apparatus of FIG. 1, microwave energy of suitable amplitude is generated by the transmitter 24 and is radiated by the transmitting antenna 22 in the form of a directed beam 18 which is preferably brought to focus on the heat exchanger 10. Since at least the window 20 is permeable to the incident electromagnetic energy, such energy is introduced into the interior of the member 12 and serves to excite the gaseous medium therein.

Under the desired operational conditions described earlier in this specification, the gaseous matter in the interior of the member 12 will be ionized with an appropriate electron density, and the energy of the electromagnetic beam 18 will be absorbed by such gaseous matter and be converted into heat therein. Assuming for the discussion of the apparatus of the heat exchanger of FIG. 1 that in some manner the cool gaseous medium enters the member 12 at the left, as indicated by the arrow 16, under a desired pressure, such incoming gas is heated by the absorption of energy from the electromagnetic beam, and the heated gas is expelled from the right-hand end of the member 12 as indicated by the arrow 28. The thrust force of this expelled gaseous medium may be utilized as a reaction stream to achieve a propulsive force, or may alternatively be employed to drive a turbine to provide rotary shaft power output.

Figure 2:
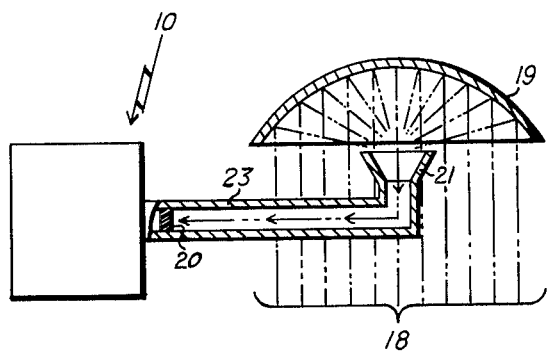
FIG. 2 is a schematic representation in elevation and partial section of a preferred means for introducing energy into the heat exchanger of FIG. 1.

The apparatus shown and described in connection with FIG. 1 serves to illustrate the basic concept of the present invention. As a practical matter, however, the density of the beamed electromagnetic field at the altitudes of which the heat exchanger 10 may be operated will generally be insufficient to directly cause ionization of the gaseous medium inside the heat exchanger. It will therefore be expedient to employ a suitable collecting means as indicated schematically in FIG. 2 to increase the strength of the field actually applied to the interior of the heat exchanger 10. As shown in FIG. 2, a curved reflector member 19 is provided for intercepting the electromagnetic beam 18 and for focusing the intercepted energy on a horn 21 or the like for transmission through a waveguide 23 or other transmission line to the heat exchanger 10. The window 20 passes the energy into the interior of member 10, but serves to prevent the gaseous medium therein from entering waveguide 23.

Figure 3:
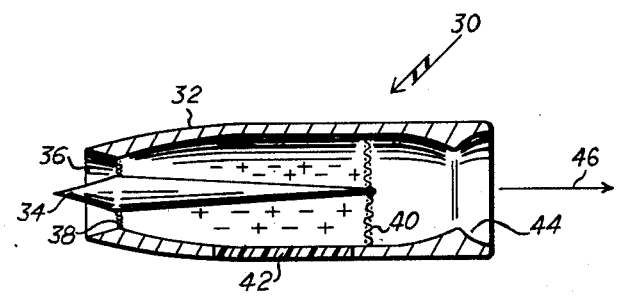
FIG. 3 is a schematic representation, in vertical section, of a ramjet engine constructed in accordance with the present invention.

FIG. 3 shows a ramjet engine constructed in accordance with the present invention, indicated generally at 30. This engine comprises a substantially cylindrical outer member or housing 32, with a central member 34 mounted therein coaxial arrangement therewith. The opening 36 in member 32 includes the inlet opening for atmospheric air to enter the engine upon relative motion of the engine and the surrounding atmosphere, as well as the usual diffuser to decrease the velocity of the air so admitted to increase the pressure thereof.

A pair of foraminous screens 38 and 40 are employed to define the heat exchanging chamber but to permit the free passage of the compressed or heated air therethrough. An area of the housing member 32 axially positioned between the two screens 38 and 40 comprises the permeable window 42, which corresponds to the window 20 of FIG. 1.

To the right (in FIG. 3) of the screen 40 is a suitable exhaust nozzle 44, such as the converging-diverging of De Laval nozzle, from which the heated propellant gas or air is expelled and expanded into the surrounding atmosphere to provide a jet stream affording a propulsive thrust on the engine 30, such stream being indicated by the arrow 46.

The operation of the ramjet engine of FIG. 3 is evident. Upon relative motion of sufficient degree between the engine 30 and the surrounding atmosphere, the air entering the inlet-diffuser 36 is compressed and then passed into the central part of the chamber defined by the two foraminous screens 38 and 40. The application of microwave electromagnetic energy by means of the window 42 results in the ionization (schematically indicated by the positive and negative signs) of the gas interior of the member 32 and the absorption of such energy in the gas. The air or gas is thus heated to a temperature much greater than the entering temperature, and the hot air expands upon being expelled from the exhaust nozzle 44, and leaves the engine with a relatively greater velocity than that of entry, producing a thrust hereby.

Figure 4:
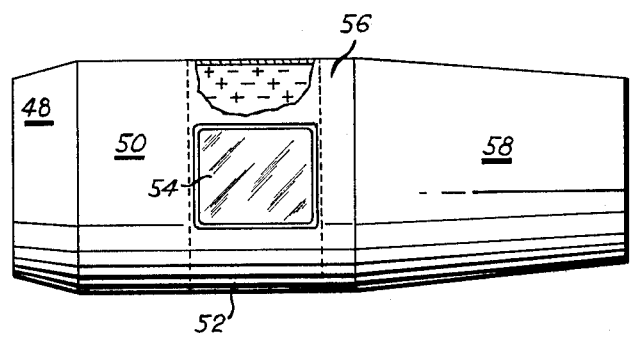
FIG. 4 is a side elevation schematic representation, partly broken away, of a turbojet engine in accordance with the present invention.

Th construction of a turbojet engine in accordance with the invention is quite similar to that of the ramjet engine of FIG. 3, and is shown schematically in FIG. 4. In the latter figure, the numeral 48 indicates the input or inlet section, next to which is a compressor 50. Following the compressor 50 is the heat-exchanging section 52, which includes a permeable window 54 or the like for the introduction of microwave energy into the interior of the heat exchanging section 52. Just downstream from the heat exchanging section 52 is a turbine section 56 having a turbine therein operated by the heated gases coming from the heat exchanging section 52. The turbine serves as the source of power for operating the compressor in the forward section 50. Following the turbine section 56 is the exhaust nozzle 58, which may take any suitable form for directing the heated gaseous medium (the atmospheric air taken into the forward inlet of the engine) into the atmosphere to be expanded therein.

The operation of the turbojet engine of FIG. 4 is apparent upon comparison with that of the ramjet engine of FIG. 3. In the turbojet engine of FIG. 4, air entering the inlet section 48 is directed into the compressor 50, where it is compressed before being passed to the heater section 52. The application of microwave energy through window 54 causes the gas within the heat exchanging section to ionize (as indicated by the positive and negative signs) and absorb energy from the incident field to produce heat. This heating of the air causes the latter to expand out through the nozzle 58 to apply a thrust to the engine.

Figure 5:
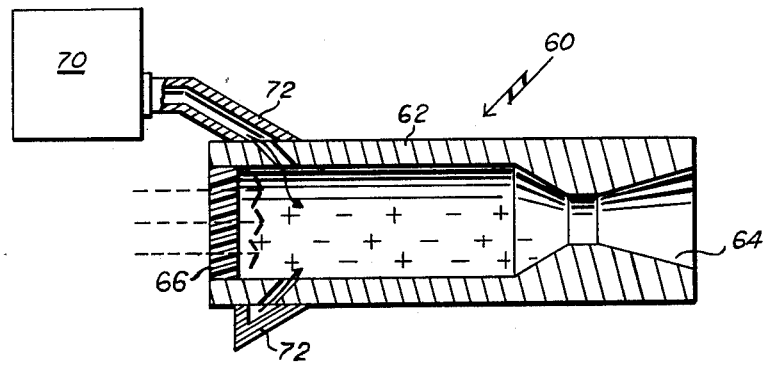
FIG. 5 is a schematic representation, in partial vertical section, of a rocket engine in accordance with the present invention.

FIG. 5 shows a rocket engine in accordance with the present invention indicated generally at 60 and comprising a substantially cylindrical housing 62 having an exhaust nozzle 64 associated therewith. The end of housing 62 remote from that of nozzle 64 includes a window 66 permeable to electromagnetic energy, such window providing a means for introducing microwave energy into the interior of the housing 62 while maintaining such housing a closed container except at the nozzle end, whereby heated gases within the housing are directed toward the exhaust nozzle. It will be understood, of course, that the microwave energy may equally well be fed to the interior of housing 62 through the nozzle 64 by means of a suitable funnel or other suitable collector. The energy so introduced into the housing is absorbed by the ionized gas therein. In order to produce a propulsive thrust at the nozzle 64, a suitable gaseous propellant medium is supplied to the interior of the housing 62 from a tank or other reservoir 70 by means of a conduit and manifold 72, the latter preferably including a suitable control valve (not shown). The operation is easily seen, with the gaseous propellant being fed into the housing 62 by means of the conduit 72, and microwave energy being applied thereto by means of the permeable window 66 to heat the ionized gaseous propellant medium and cause the latter to be expelled into the outer atmosphere through the exhaust nozzle 64.

The closed-cycle engine indicated in block form in

Figure 6:
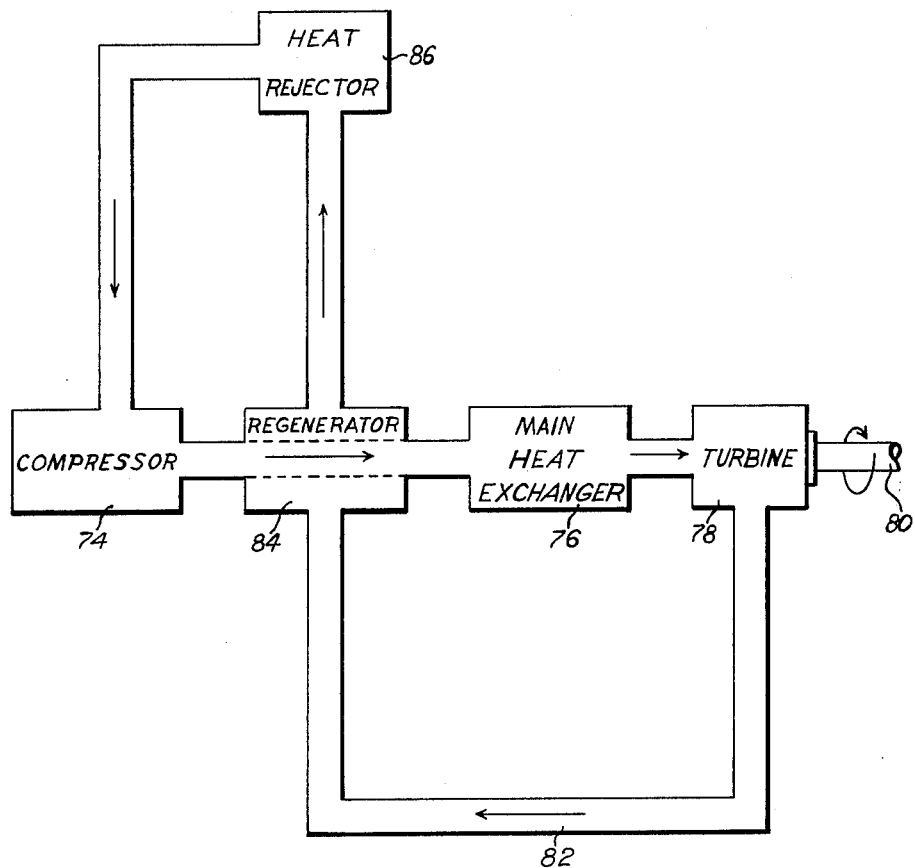
FIG. 6 is a block diagram of a closed-cycle turbine engine employing the heat exchanger of the present invention and providing a rotary shaft output.

FIG. 6 is particularly well adapted for operation with a heat exchanger of the type of the present invention, since the closed-cycle operation permits close control over the pressure of the gaseous medium which is to be heated and expanded, and further, the closed-cycle loop may enclose a quantity of a gas other than air and having more desirable characteristics than the atmospheric air.

It has been found that air is not the most desirable gas to employ in the closed-cycle engine loop, since the breakdown field for air is undesirably high in comparison to that for other available gases. This high breakdown field may be attributed to at least two causes. In the first place, oxygen has a positive electron affinity, and free electrons therefore tend to attach to the neutral molecules, producing heavy negative ions which are not capable of absorbing energy effectively from the incident electric field. Second, electons lose only a small fraction of their energy in an elastic collision with a neutral molecule, and by gaining energy from an incident A.C. field between collisions they may accumulate high energies. However, electrons can lose a large fraction of their energy when they undergo inelastic collisions. The first inelastic excitation potential occurs for oxygen at 1.97 ev., thus making it difficult for electrons to reach the oxygen ionization potential of 13.6 ev.

An exemplary gaseous medium having more desirable characteristics in this respect is a mixture of helium with a small proportion of mercury, such gas having a first inelastic level of 19.8 ev. One reason for the low breakdown field is that helium, like other noble gases, does not remove free electrons by attachment. In addition, the first inelastic level, at 19.8 ev., is a metastable state from which transitions to the ground state by radiation are forbidden. The mean lifetime is of the order of thousands of microseconds so that practically every excited helium atom collides with and ionizes a mercury atom which has an ionization potential of 10.44 ev. For all practical purposes the result is that inelastic loses can be neglected because practically every excited helium atom produces a free electron by the following process, known as the Penning effect:

$$He^* + Hg \rightarrow He + Hg^+ + e^-$$

where He* is the excited helium atom. The probability for this process is so great that very small additions of mercury produce large effects on the characteristics of the main gas. At one atmosphere pressure, breakdown occurs with a power density of 1.5 kilowatts per square cm. (corresponding to an electric field intensity of 760 volts/cm.). For 10,000 megacycle microwaves, which can be transmitted in a waveguide of 2.3 cm.² cross section, He-Hg breakdown is a feasible heat transfer process for engines operating above a power level of about 4 kilowatts. The use of pure helium gas would increase the power needed for breakdown by about a factor of four. As is evident, still other gas mixtures may be employed, and a .01 percent argon addition to neon is exemplary thereof.

Referring now particularly to FIG. 6, the closed-cycle engine shown comprises a compressor 74 which compresses the gaseous medium employed and feeds it to the main heat exchanger 76. The heated and expanding gas from heat exchanger 76 drives a suitable turbine 78, the output of which is shown as a rotary shaft 80. The hot exhaust from the turbine 78 is fed through a conduit 82 to an auxiliary heat exchanger 84 which serves to pre-heat the gas passing from the compressor 74 to the main heat exchanger 76 by extracting heat from the exhaust gas in conduit 82. The exhaust gas leaving the auxiliary heat exchanger 84 is further cooled in a heat rejector 86 before being returned to the compressor 74 to complete the closed cycle. As will be apparent to those skilled in the art, rotary output shaft 80 may drive a propeller or the like to create a propulsive thrust for an associated vehicle, or may drive a second or propulsion turbine which compresses air or some other suitable propellant medium for application to an exhaust nozzle to produce a jet stream propulsion means.

The invention has been described above in considerable detail, and particularly with reference to the utilization of radiated microwave energy to create heat at a remote location for use in providing a means of propulsion for an aircraft or the like. However, it will be apparent to those skilled in the art that the invention is equally applicable to other remotely energized heat exchangers which produce heat for purposes other than that of propulsion. Further, with respect to its application to rocket engines, the inventive concept of the present invention is not limited to the use of liquid propellants as described herein, but may be employed with suitable structures for heating a solid propellant in such an engine. In addition, where means are provided in assotion with the heat exchanger for collecting energy from the electromagnetic beam and feeding it to the interior of the heat exchanger through a suitable transmission line or the like, one or more suitable electrodes may be employed within the heat exchanger to facilitate the transfer of energy from the transmission line to the gaseous medium. Hence, the invention is not to be considered as being limited to the particular details given, nor to the specific application to which reference has been made during the description of the apparatus, except insofar as may be required by the scope of the appended claims.

What is claimed is:

1. A remotely-energized heat exchanging system, comprising container means for at least partially enclosing a gaseous medium at a pressure of at least two pounds per square inch, a gaseous medium within said container means consisting principally of an inert gas and at least one other gas of relatively low ionization potential making said medium readily ionizable, and means for irradiating such gaseous medium with microwave energy of such amplitude to cause ionization thereof so that the electron density within said medium is at least one to ten times greater than the plasma resonance density, whereby such gaseous medium absorbs such energy to produce heat.

2. A heat exchanger comprising container means, a gaseous medium, a gaseous medium within said container means consisting principally of an inert gas and at least one other gas of relatively low ionization potential making said medium readily ionizable within said container means at a pressure greater than substantially two pounds per square inch, and means for admitting microwave energy into said container means to ionize said gaseous medium so that the electron density within said medium is at least one to ten times greater than the plasma resonance density, whereby heat is produced in the ionized gaseous medium upon absorption of such microwave energy.

3. A remotely-energized motive system, comprising means for at least partially enclosing a gaseous medium at a pressure greater than two pounds per square inch, a gaseous medium within said container means consisting principally of an inert gas and at least one other gas of relatively low ionization potential making said medium readily ionizable, means for irradiating such gaseous medium with microwave energy of such amplitude to cause ionization thereof so that the electron density within said medium is at least one to ten times greater than the plasma resonance density, and means for utilizing the thermal expansion of such ionized gaseous medium occurring upon the absorption of such microwave energy therein to produce an output force.

4. A heat exchanger in accordance with claim 2 wherein said inert gas is helium and said other gas is mercury.

5. A heat exchanger in accordance with claim 2 wherein said inert gas is neon and said other gas is argon.

6. An energy exchanger comprising container means, a gaseous medium within said container means consisting principally of a mixture of gases at a pressure of at least two pounds per square inch such that electron density within said medium is at least one to ten times greater than the plasma resonance density of said mixture, and means for launching electromagnetic wave energy into said container means whereby said gas is ionized and heated by absorption of said wave energy.

7. An energy exchanger comprising container means, a gaseous medium within said container means consisting principally of a mixture of a substantially inert gas and at least one other gas at a pressure of at least two pounds per square inch such that electron density within said medium is at least one to ten times greater than the plasma resonance density of said mixture, and means for launching electromagnetic wave energy into said container means whereby said gas is ionized and heated by absorption of said wave energy.

8. An energy exchanger comprising container means, a gaseous medium within said container means consisting principally of a mixture of a substantially inert gas and at least one other gas at a pressure greater than two pounds per square inch so that electron density within said medium is at least one to ten times greater than the plasma resonance density of said mixture in said container means, and means for launching electromagnetic wave energy into said container means whereby said gas is ionized and heated by absorption of said wave energy.

9. An energy exchanger comprising container means, a gaseous medium at a pressure of at least two pounds per square inch within said container means including a mixture of at least two gases, at least one of said gases having a first inelastic excitation potential greater than the ionization potential of another of said gases, and means for launching electromagnetic wave energy into said container means to ionize said gaseous medium so that the electron density within said medium is at least one to ten times greater than the plasma resonance density and by absorption of said wave energy to heat said gaseous medium.

10. An energy exchanger comprising container means, a gaseous medium at a pressure of at least two pounds per square inch within said container means, said gaseous medium including a mixture of gases, said mixture including at least one substantially inert gas and at least one other gas of relatively low ionization potential, the mixture being pressurized so that the Penning effect occurs when elemental particles of the inert gas are excited, and means for launching electromagnetic wave energy into said container to excite said inert gas elemental particles so that the electron density within said medium is at least one to ten times greater than the plasma resonance density whereby said wave energy is absorbed and said gaseous medium is heated.

11. An energy exchanger comprising container means, a gaseous medium within said container means, said gaseous medium including a mixture of gases, said mixture including at least one gas having a relatively high first inelastic excitation potential and at least one other gas of relatively low ionization potential, the mixture being pressurized so that the Penning effect occurs when elemental particles of said one gas are excited, and means for launching electromagnetic wave energy into said container to excite said inert gas particles at a pressure of at least two pounds per square inch so that the electron density within said medium is at least one to ten times greater than the plasma resonance density whereby said wave energy is absorbed and said gaseous medium is heated.

12. An energy exchanger comprising container means, a gaseous medium within said container means, said gaseous medium including a mixture of gases, said mixture including at least one substantially inert gas having a relatively high first inelastic excitation potential and at least one other gas of relatively low ionization potential, the mixture being pressurized so that the Penning effect occurs when elemental particles of said inert gas are excited, and means for launching microwave energy into said container to excite said inert gas particles at a pressure of at least two pounds per square inch so that the electron density within said medium is at least one to ten times greater than the plasma resonance density whereby said microwave energy is absorbed and said gaseous medium is heated.

13. An energy exchanger comprising a container and a gaseous medium pressurized to at least two pounds per square inch within said container adapted to absorb substantially all electromagnetic wave energy within a predetermined frequency range so that said gaseous medium is ionized upon incidence of said energy such that the electron density within said medium is at least equal to the plasma resonance density and means for launching microwave energy into said container.

References Cited by the Examiner

UNITED STATES PATENTS

| | | | |
|---|---|---|---|
| 1,700,675 | 1/29 | Goddard | 60—26 |
| 2,471,744 | 5/49 | Hershberger | 324—92 |
| 2,546,210 | 3/51 | Brittner | 60—35.5 |
| 2,564,675 | 8/51 | Crook | 219—10.55 |
| 2,585,810 | 2/52 | Mallinckrodt | 60—35.5 |
| 2,585,970 | 2/52 | Shaw. | |
| 2,627,600 | 2/53 | Rines | 250—25 X |
| 2,758,188 | 8/56 | Okress | 219—10.55 |
| 2,837,693 | 6/58 | Norton | 313—63 X |
| 2,943,175 | 6/60 | Guanella | 219—10.55 |

SAMUEL LEVINE, *Primary Examiner.*

ARTHUR M. HORTON, SAMUEL FEINBERG,
*Examiners.*